United States Patent
Yun et al.

(10) Patent No.: US 7,831,755 B2
(45) Date of Patent: Nov. 9, 2010

(54) METHOD AND SYSTEM FOR INTERFACING A PLURALITY OF MEMORY DEVICES USING AN MMC/SD PROTOCOL

(75) Inventors: Kil-Joong Yun, Yongin-si (KR); Seon Taek Kim, Suwon-si (KR); Jae Hoon Lee, Yongin-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 224 days.

(21) Appl. No.: 12/034,053

(22) Filed: Feb. 20, 2008

(65) Prior Publication Data

US 2008/0209092 A1    Aug. 28, 2008

(30) Foreign Application Priority Data

Feb. 26, 2007    (KR) .................. 10-2007-0018905

(51) Int. Cl.
*H05K 7/10*    (2006.01)
*G06F 13/14*   (2006.01)
*G06F 13/36*   (2006.01)

(52) U.S. Cl. ............... 710/301; 710/305; 710/308; 710/312

(58) Field of Classification Search .......... 710/301, 710/305, 308, 312
See application file for complete search history.

(56) References Cited

U.S. PATENT DOCUMENTS

| 7,162,569 B2* | 1/2007 | Conley et al. ............ 711/103 |
| 2004/0064612 A1* | 4/2004 | Pinto et al. ............... 710/105 |
| 2006/0218324 A1* | 9/2006 | Zayas ....................... 710/65 |
| 2007/0033334 A1* | 2/2007 | Katayama et al. ........ 711/103 |

FOREIGN PATENT DOCUMENTS

| JP | 05342095 | 12/1993 |
| KR | 200481449 | 9/2004 |
| KR | 20050110609 | 11/2005 |

* cited by examiner

*Primary Examiner*—Mark Rinehart
*Assistant Examiner*—Jeremy S Cerullo
(74) *Attorney, Agent, or Firm*—Volentine & Whitt, PLLC

(57) ABSTRACT

A method for establishing an interface between a host and a plurality of memory devices of a system that utilizes a Multimedia Card (MMC) or Digital (SD) protocol according to an interleaving scheme. A host sequentially transmits a first sequence of commands and data to a system bus in order to allow a first memory device among the memory devices to perform a first operation. The host then transmits a second sequence of commands and data to the system bus to allow a second memory device among the memory devices to perform a second operation after transmitting the first sequence of commands and data.

18 Claims, 10 Drawing Sheets

METHOD AND SYSTEM FOR INTERFACING A PLURALITY OF MEMORY DEVICES USING AN MMC/SD PROTOCOL

CROSS-REFERENCE TO RELATED PATENT APPLICATIONS

This application claims the benefit of Korean Patent Application No. 10-2007-0018905, filed on Feb. 26, 2007, in the Korean Intellectual Property Office, the disclosure of which is incorporated herein in its entirety by reference.

BACKGROUND OF THE INVENTION

1. Field of the Invention

The present invention relates to a system having a plurality of memory devices. More particularly, the present invention relates to a method for establishing an interface between a host and a plurality of memory devices of a system that utilizes a Multimedia Card (MMC) or Secure Digital (SD) protocol according to an interleaving scheme.

2. Discussion of Related Art

With advancements in storage media technology, various types of memory have recently been manufactured as auxiliary storage for portable electronic devices such as mobile phones and digital cameras. Examples of these types of memories include compact flash, Multimedia Cards (MMC), Smart Media Cards (SMC), and Secure Digital (SD) cards. Because these memory devices are small and light, they are suitable as data storage in portable electronics.

Generally, memory devices are coupled to a host (e.g., a computer) via a system bus. The memory devices and the host use a predetermined communication protocol (e.g. MMC or SD) to establish data communication therebetween. FIG. 1 is a diagram illustrating a conventional interface system between host 10 and a plurality of memory devices 20-1 through 20-n that utilizes a general MMC or SD protocol. Host 10 is connected to memory devices 20-1 through 20-n via system bus 30 and may be individually controlled by host 10. The memory devices 20-1 through 20-n and the host 10 communicate using a predetermined protocol stored in host 10. In a system using MMC or SD card specifications, the operating mode of each of the memory devices 20-1 through 20-n may include a card identification mode and a data transfer mode.

In the card identification mode, host 10 may request each of the memory devices 20-1 through 20-n to provide a card identification number (CID number). If a memory device card (e.g. first memory device 20-1) among the memory devices 20-1 through 20-n successfully responds to the request from host 10, host 10 then allocates a Relative Card Address (RCA) to the first memory device 20-1. If the RCA is allocated to first memory device 20-1, the first memory device 20-1 enters the data transfer mode. In the data transfer mode, first memory device 20-1 may be in various states, such as a stand-by state, a transfer state, a sending data state, a receiving data state, and a programming state.

In general, in a system that utilizes the MMC or SD protocol, only a memory device among the memory devices 20-1 through 20-n that enters the transfer state performs an operation (e.g., a write operation) in response to operating commands (write commands, etc.) received from host 10. For example, the memory devices other than the first memory device 20-1 are in the stand-by state when first memory device 20-1 is in a program busy state. That is, host 10 does not transmit commands or data necessary to perform the write operation to any one of the memory devices other than memory device 20-1 until the end of the busy time of the write operation performed by first memory device 20-1. In addition, if host 10 checks whether the busy time ends by using a polling method, the process increases the load on host 10. Accordingly, there is a need for a method and system for allowing the host to rapidly and efficiently establish an interface with each of the memory devices.

SUMMARY OF THE INVENTION

Exemplary embodiments of the present invention are directed to a method and system for rapidly and efficiently establishing an interface between a host and a plurality of memory devices that use a Multimedia Card (MMC) or Secure Digital (SD) protocol using an interleaving scheme. In an exemplary embodiment, the method transmitting a first sequence including a first selection command to select only a first memory device, a first command for determining a total number of first data blocks to be transmitted, a second command to perform write operation, and a plurality of first data blocks; and transmitting a second sequence including a second selection command to select only a second memory device, the first command for determining a total number of second data blocks to be transmitted, the second command, and a plurality of second data blocks after transmitting the first sequence during a program busy time of the first memory device.

The first and second memory devices are in a disconnected state, a stand-by state, a transfer state, or a data receiving state before the plurality of second data blocks are received, respectively, and the first and second memory devices are in either the data receiving state or the disconnect state until the total number of the first data blocks and the total number of the second data blocks is received from the host after receiving the plurality of second data blocks in response to the first or second selection command, respectively.

DESCRIPTION OF EMBODIMENTS

Figure 1:
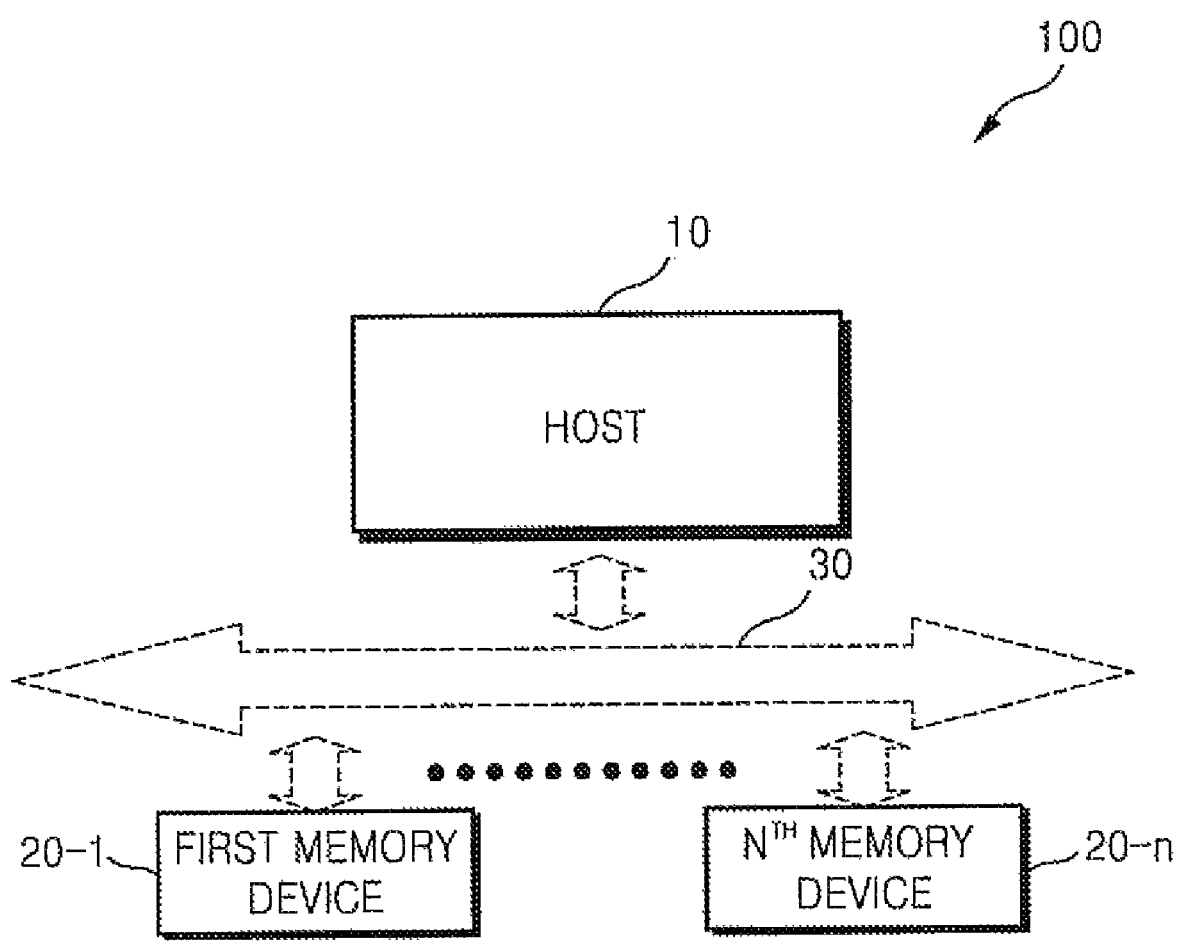
FIG. 1 is a diagram illustrating a conventional interface system between a host and a plurality of memory devices that utilize a Multimedia Card (MMC) or Secure Digital (SD) protocol.

The present invention will now be described more fully hereinafter with reference to the accompanying drawings, in which preferred embodiments of the invention are shown. This invention, however, may be embodied in many different forms and should not be construed as limited to the embodiments set forth herein. Rather, these embodiments are provided so that this disclosure will be thorough and complete, and will fully convey the scope of the invention to those skilled in the art. In the drawings, like numbers refer to like elements throughout. It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Figure 2:
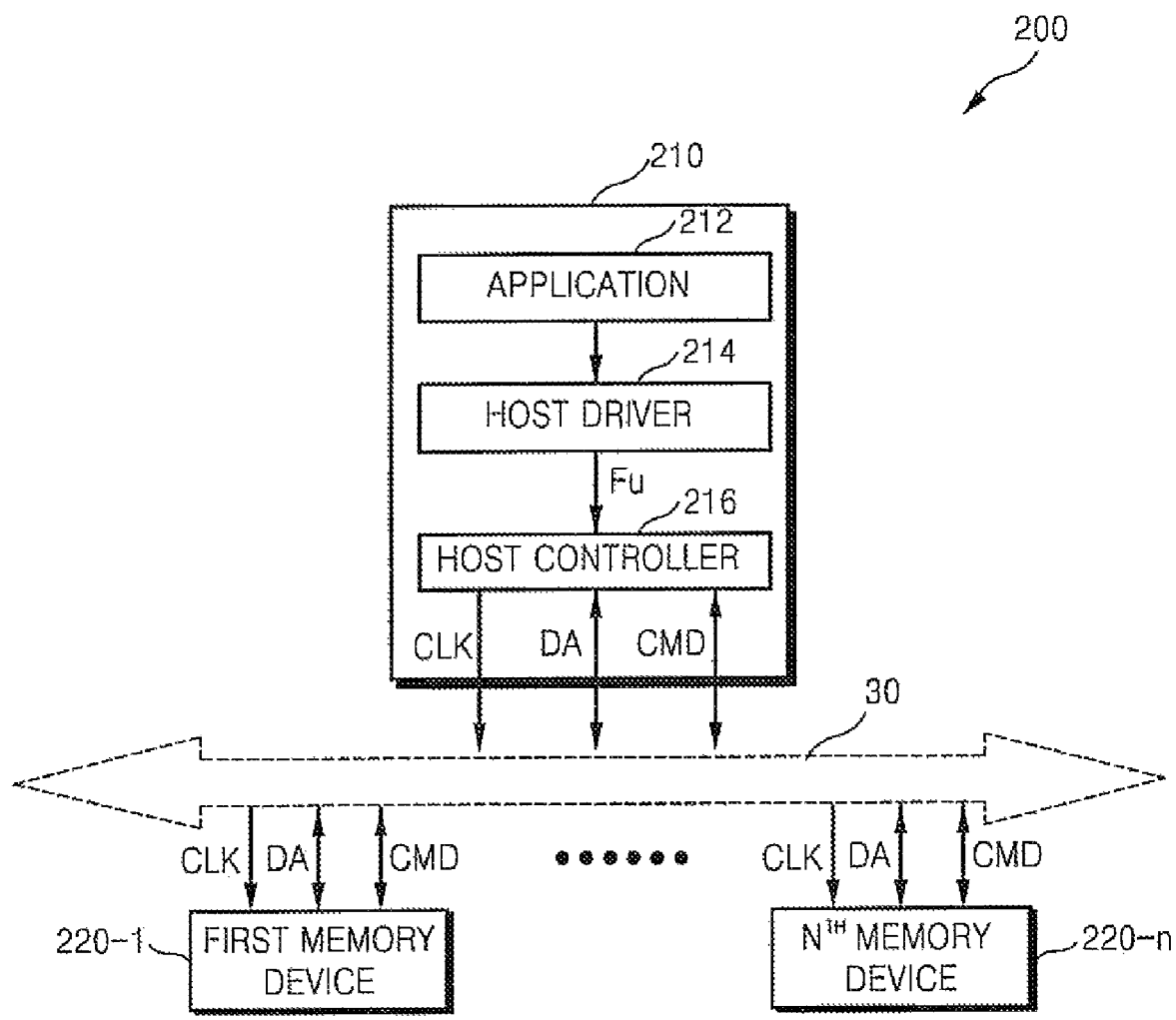
FIG. 2 is a block diagram of an interface system between a host and a plurality of memory devices that use the MMC or SD protocol according to an embodiment of the present invention.

FIG. 2 is a block diagram of an interface system 200 between a host 210 and a plurality of memory devices 220-1 through 220-n (where n is a natural number) using a Multimedia Card (MMC) or Secure Digital (SD) protocol. Interface system 200 includes host 210 connected to system bus 30 and memory devices 220-1 through 220-n also connected to system bus 30. The interface established between host 210 and each of the memory devices 220-1 through 220-n via system bus 30 is in accordance with a predetermined communications protocol. Memory devices 220-1 through 220-n may all use the MMC or SD protocol or may be a combination of memory devices that use the MMC or SD protocol. Similarly, system bus 30 may also utilize the MMC or SD interface protocol.

Host 210 may be a memory device controller such as an MMC or SD controller that includes application unit 212, host driver 214, and host controller 216. Application unit 212 may be a user application program such as, for example, an MP3 player or electronic memo pad. Host driver 214 may transmit a command to host controller 216 such as a read or write operation which is requested by the application program. Host controller 216 may transmit the command received from host driver 214 to the memory devices 220-1 through 220-n via system bus 30 based on the predetermined communication protocol such as, for example, the MMC or SD protocol.

Host 210 may be a memory device controller such as an MMC/SD controller that includes application unit 212, host driver 214, and host controller 216. Application unit 212 may be a user application program such as, for example, an MP3 player or electronic memo pad. Host driver 214 may transmit a command to host controller 216 such as a read or write operation which is requested by the application program. Host controller 216 may transmit the command received from host driver 214 to the memory devices 220-1 through 220-n via system bus 30 based on the predetermined communication protocol such as, for example, the MMC/SD protocol.

Host 210 sequentially transmits a first sequence of commands and data to system bus 30 to allow first memory device 220-1 to perform a first operation. After transmitting the first sequence of the commands and data, the host 210 sequentially transmits a second sequence of commands and data to system bus 30 to allow a second memory device 220-2 to perform a second operation. The first and second operations may be write operations with the first and second sequence of commands having various formats. Host 210 transmits the second sequence of commands and data to system bus 30 during a program busy time in which first memory device 220-1 conducts a programming operation.

Figure 3:
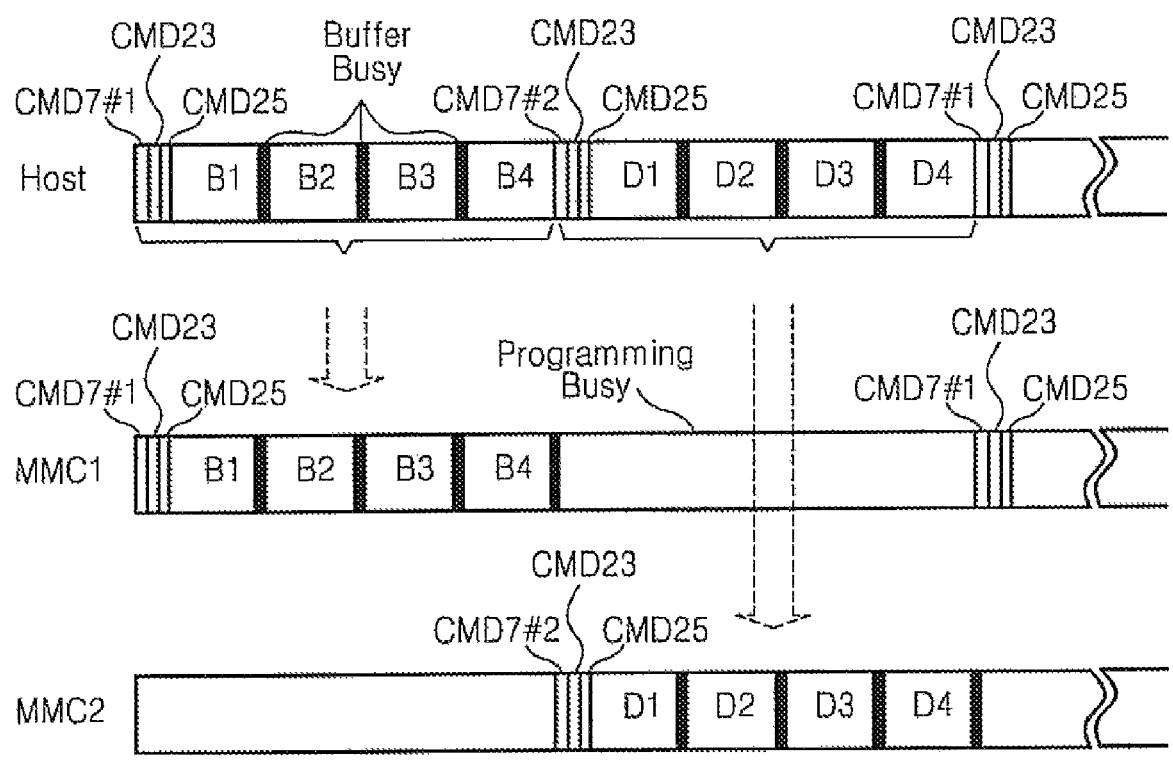
FIG. 3 is a first timing diagram of a predefined write operation of a system that uses the MMC or SD protocol according to an embodiment of the present invention.

FIGS. 3 through 6 are timing diagrams where memory devices 220-1 through 220-n are multimedia cards (MMCs) and are initialized by host 210 to enter the stand-by state before performing the write operation. FIG. 3 illustrates a predefined write operation of a system that uses the MMC or SD protocol in accordance with an embodiment of the present invention. The first sequence of the commands and data may be first selection command CMD7#1, first command CMD23, second command CMD25, and first data B1 through B4 based on first command CMD23. The second sequence of commands and data may be second selection command CMD7#2, first command CMD23, second command CMD25, and second data D1 through D4 based on first command CMD23. These commands may be defined in relation to a memory card according to particular MMC specifications. For example, CMD7 may include a relative address (e.g., address #1) of a selected memory card. Only a memory card among a plurality of memory cards in a stand-by state, which corresponds to the comparative address #1 contained in command CMD7 can be switched to a transfer state. In this manner, the first selection command CMD7#1 may instruct only the first memory device 220-1 (e.g., a first multimedia card MMC1) to be selected among the memory devices 220-1 through 220-n. Similarly, second selection command CMD7#2 may instruct only the second memory device 220-2 (e.g., a second multimedia card MMC2) to be selected among the memory devices 220-1 through 220-n.

First command CMD23 determines the data size (the total number of data blocks) to be transmitted. Second command CMD25 instructs the write operation to be performed on the data, the size of which is determined according to the first command CMD23. In particular, the first multimedia card MMC1 (first memory device 220-1) is selected in response to the first selection command CMD7#1 where only the first multimedia card MMC1 is switched from the stand-by state to the transfer state. Since the programming of an MMC is performed in page units, first command CMD23 instructs the total number of data blocks to be transmitted based on the capacity of a page buffer included in each of the multimedia cards 220-1 through 220-n. For example, if the page buffer included in the MMC is 2 Kbytes, first command CMD23 instructs four 512-byte data blocks, e.g., the first data B1 through B4, to be transmitted.

The second command CMD25 instructs the write operation to be performed using data B1 through B4 associated with the predetermined 4 blocks. First multimedia card MMC1 is switched from the transfer state to the "receiving data" state in response to first command CMD23 and second command CMD25. First multimedia card MMC1 temporarily stores a data block (e.g., data B1=512 bytes) received from host 210 in a page buffer (not shown) or an internal RAM (not shown). The length of time required to temporarily store the data block is referred to as a "buffer busy time." It is assumed that the starting address of the data block B1 is arranged with respect to the starting location of a page of a non-volatile memory core (NAND core) included in first memory device 220-1.

The first multimedia card 220-1 performs programming when the page buffer is filled with received data blocks (e.g., the data B1 through B4) or when an address for the write operation is identical to the last address of the page of the non-volatile memory core. The length of time required for the programming operation is referred to as a "programming busy time." Generally, the programming busy time is longer than the buffer busy time. For example, if the capacity of the page buffer is 2 Kbytes and transmission of the four 512-byte data blocks B1 through B4 to first multimedia card MMC1 (first memory device 220-1) via system bus 30 is completed, then the first multimedia card MMC1 executes the programming operation. Thus, the first multimedia card MMC1 is in a programming state. During the programming busy time in which first multimedia card MMC1 (first memory device 220-1) performs the programming operation, host 210 outputs the second sequence of commands and data to system bus 30 in order to perform a write operation on the second multimedia card MMC2 (second memory device 220-2). The second multimedia card MMC2 (second memory device 220-2) is switched from the stand-by state to the transfer state in response to the second selection command CMD7#2. The first multimedia card MMC1 (first memory device 220-1) is switched from the programming state to a disconnected state in response to the second selection command CMD7#2. When the first multimedia card MMC1 completes the write operation, it returns to the stand-by state. In this manner, host 210 of system 200 is capable of improving overall system performance by overlapping the program busy time of the first multimedia card MMC1 (first memory device 220-1) with a time required to transmit the second sequence of commands and data in order to perform a write operation on the second multimedia card MMC2 (second memory device 220-2) by using an interleaving scheme. Host 210 is capable of recognizing a plurality of physical multimedia cards (physical memory devices) as one logical device using the above interleaving scheme.

Figure 4:
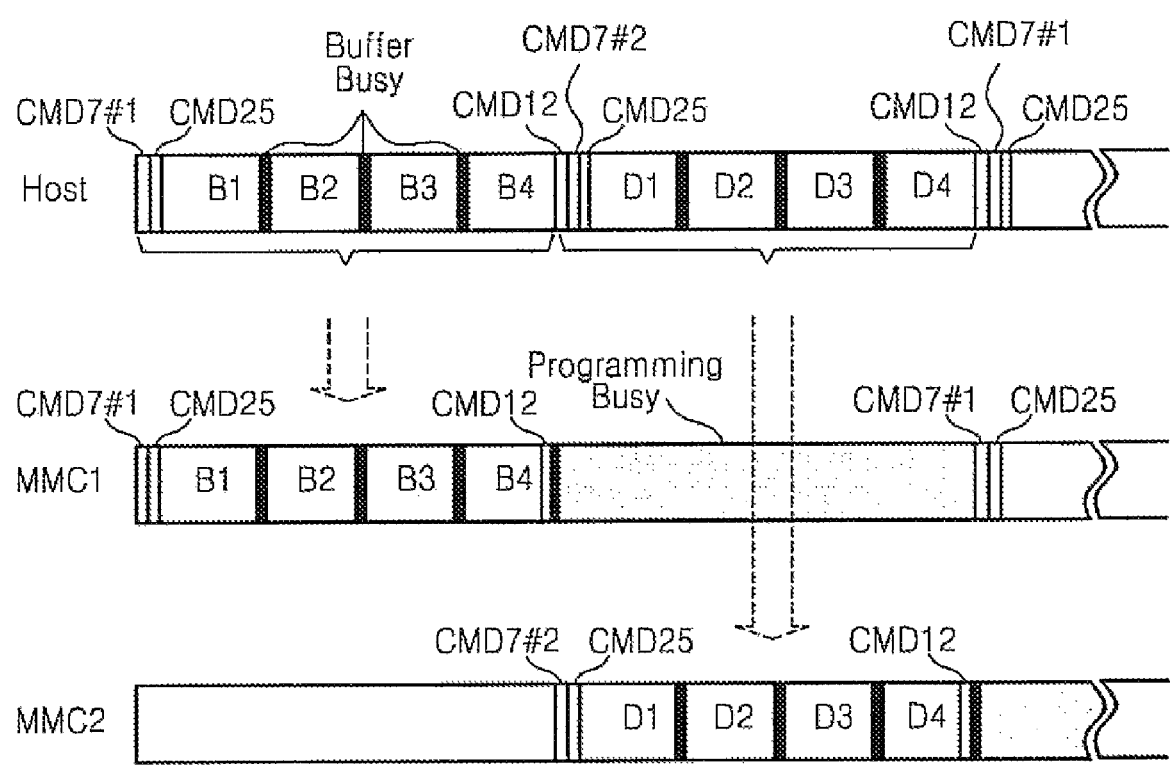
FIG. 4 is a second timing diagram of an open-ended write operation of a system that uses the MMC or SD protocol according to an embodiment of the present invention.

As shown in FIG. 3, host 210 must use each of the CMD7#1, CMD23, and CMD25 commands three times in order to instruct the predefined write operation to be performed on first multimedia card MMC1 (first memory device 220-1) having a 2 Kbyte page buffer by using a total of 12 data blocks. FIG. 4 is a second timing diagram of an open-ended write operation of a system that uses the MMC or SD protocol. In the open-ended write operation, host 210 of FIG. 2 utilizes CMD25 and CMD12 as write commands. The first sequence of commands and data may include a first selection command CMD7#1, a command CMD25 that instructs the write operation to be performed, first data B1 through B4 transmitted from host 210 (shown in FIG. 2) and a stop command CMD12 that discontinues transmission of the first data B1 through B4. The second sequence of commands and data may include a second selection command CMD7#2, command CMD25 which instructs the write operation to be performed, second data D1 through D4 transmitted from host 210, and a stop command CMD12 that discontinues transmission of second data D1 through D4.

In the open ended write operation, command CMD25 instructs the write operation to be performed using data blocks transmitted from host 210 until receipt of stop command CMD12 which discontinues the transmission of data blocks from host 210. Since four data blocks are transmitted after command CMD25 and the stop command CMD12 is transmitted from host 210 to system bus 30, the write operation can be performed as described above with reference to FIG. 3. Host 210 must use each of the commands CMD7#1, CMD25, and CMD12 three times to instruct the open-ended write operation to be performed on the first multimedia card MMC1 (first memory device 220-1) having a 2 Kbyte page buffer by using a total of 12 data blocks (e.g., data blocks B1 through B12).

Figure 5:
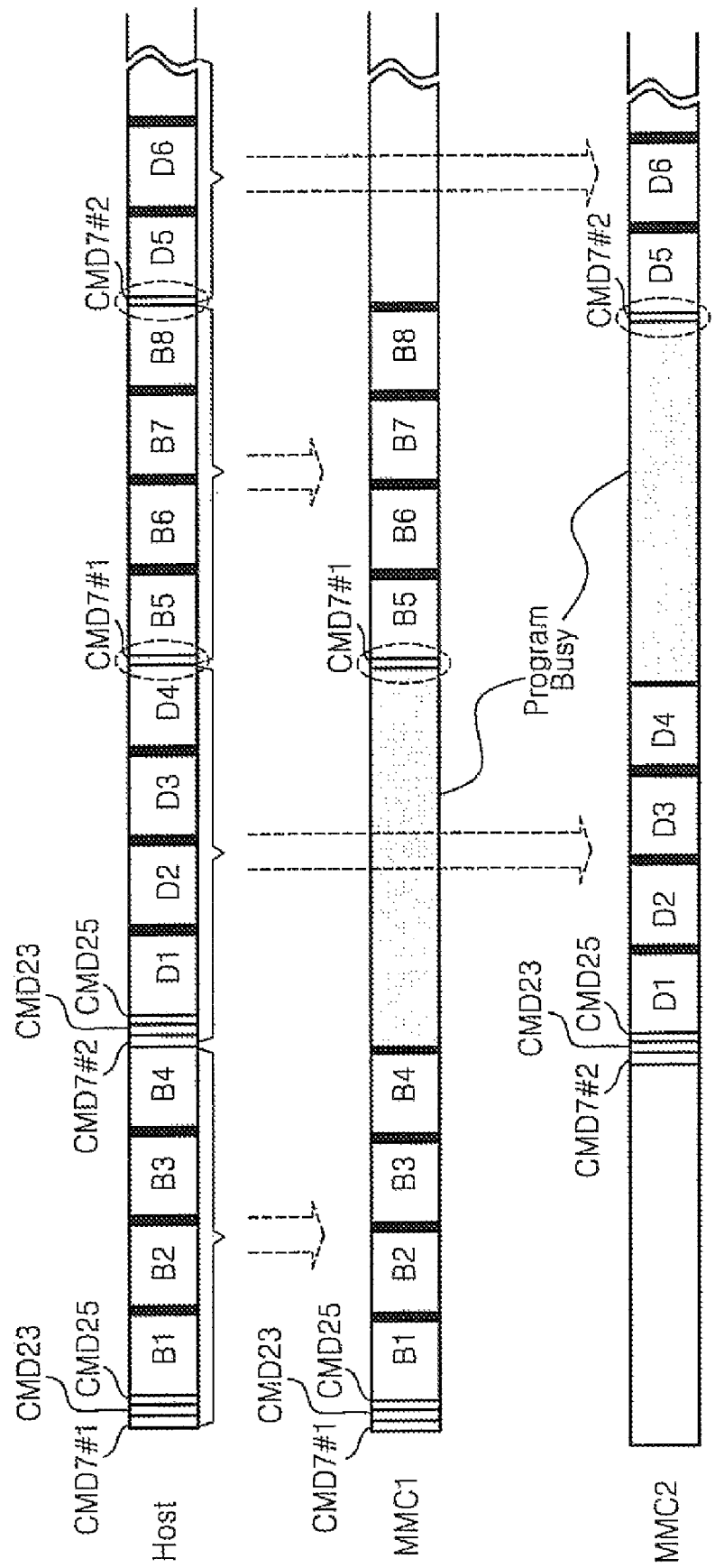
FIG. 5 is a third timing diagram of a predefined write operation of a system that uses the MMC or SD protocol according to an embodiment of the present invention.

FIG. 5 is a third timing diagram of a predefined write operation for a system that uses the MMC or SD protocol. The first sequence of commands and data may include first selection command CMD7#1, first command CMD23 for determining the size of the data to be transmitted for the predefined write operation, second command CMD25, and first data B1 through B4 transmitted from host 210. The second sequence of commands and data may include second selection command CMD7#2, first command CMD23, second command CMD25, and second data D1 through D4 transmitted from host 210. For example, first command CMD23 included in the first sequence of commands and data may instruct a total of 12 data blocks (e.g., data blocks B1 through B12) to be transmitted to first multimedia card MMC1 (first memory device 220-1) having a 2 Kbytes page buffer where one data block is 512bytes long. First multimedia card MMC1 (first memory device 220-1) is switched from the stand-by state to the transfer state in response to first selection command CMD7#1. First multimedia card MMC1 is then switched from the transfer state to the "receiving data" state in response to first command CMD23 and second command CMD25. Host 210 transmits the four 512-byte data B1 through B4 to first memory card 220-1 and then transmits the second selection command CMD7#2 to system bus 30.

First multimedia card MMC1 (first memory device 220-1) is switched from the "receiving data" state to the disconnected state and the second multimedia card MMC2 (second memory device 220-2) is switched from the stand-by state to the transfer state in response to the second selection command CMD7#2 output to system 30. Second multimedia card MMC2 (second memory device 220-2) is switched from the transfer state to the "receiving data" state in response to the first command CMD23 and second command CMD25 included in the second sequence of commands and data. Host 210 may transmit first selection command CMD7#1 to system bus 30 after transmission of the second data D1 through D4. In this case, first multimedia card MMC1 (first memory device 220-1) is switched from the disconnected state to the "receiving data" state. The second multimedia card MMC2 (second memory device 220-2) is switched from the "receiving data" state to the disconnected state in response to the first selection command CMD7#1 transmitted to system bus 30 after transmission of the second data D1 through D4. In this manner, the first multimedia card MMC1 and the second multimedia card MMC2 are in either the "receiving data" state or the disconnected state until the total number of data blocks (e.g., a total of 12 data blocks) is received from host 210 associated with performance of the predefined write operation (as differentiated from general MMC or SD card specifications). For example, first multimedia card MMC1 (first memory device 220-1) is switched from the "receiving data" state to the disconnected state and vice versa until receiving all the total of the 12 data blocks (data B1 through B12) from host 210 in response to the first or second selection commands CMD7#1 or CMD7#2.

FIG. 5 illustrates another timing diagram of a predefined write operation of a system that uses the MMC or SD protocol. Host 210 first uses each of the commands CMD7#1, CMD23, and CMD25 only once and then uses command CMD7#1twice in order to instruct the predefined write operation to be performed on the first multimedia card MMC1 (first memory device 220-1) having the 2 Kbyte page buffer by using a total of 12 blocks (data B1 through B12). Thus, the total number of commands that host 210 uses in order to perform the predefined write operation illustrated in FIG. 5 is less than the number of commands required to perform the predefined write operation illustrated in FIG. 3.

Figure 6:
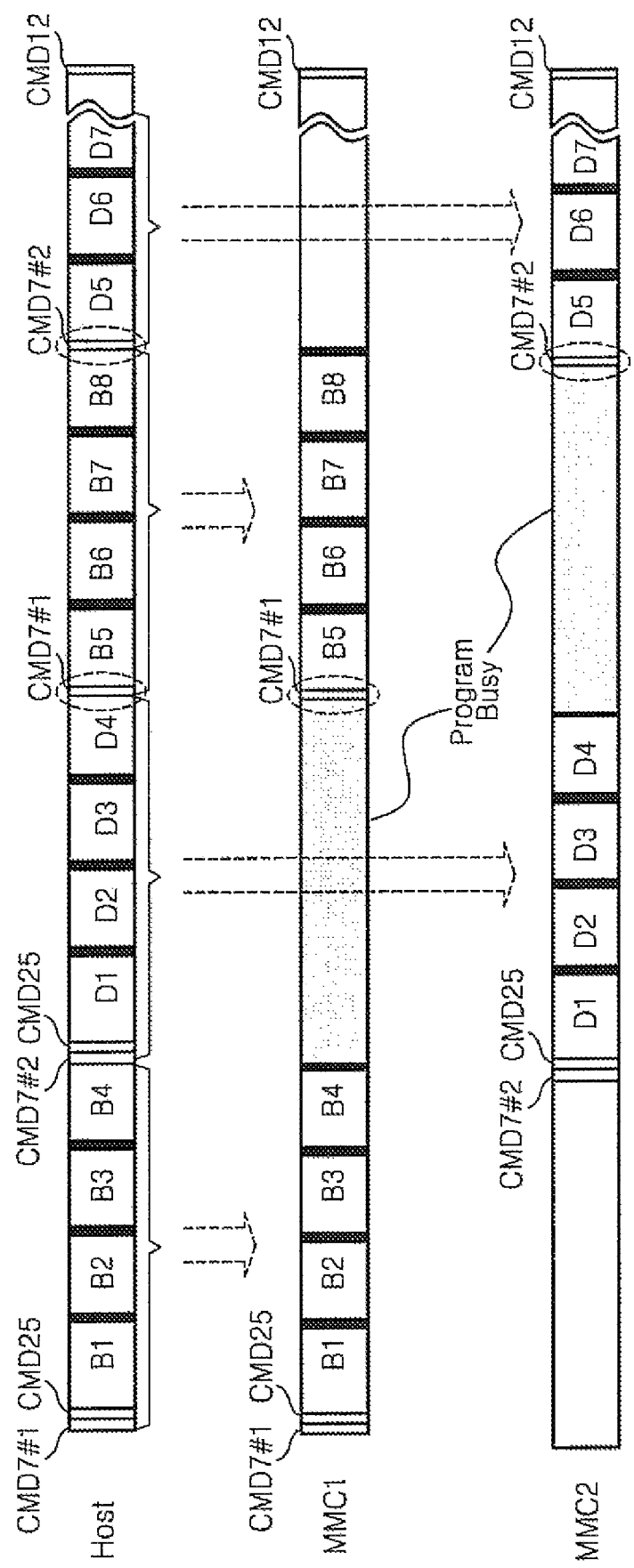
FIG. 6 is a fourth timing diagram of an open-ended write operation of a system that uses MMC or SD protocol according to an embodiment of the present invention.

FIG. 6 is a fourth timing diagram of an open-ended write operation of a system that uses the MMC or SD protocol. The first sequence of commands and data may include first selection command CMD7#1, first command CMD25 that instructs the open-ended write operation to be performed, and first data B1 through B4 transmitted from host 210. The second sequence of commands and data may include second selection command CMD7#2, first command CMD25, and second data D1 through D4 transmitted from host 210. Host 210 transmits first selection command CMD7#1 to system bus 30 after transmitting the second data D1 through D4. A state change associated with first multimedia card MMC1 (first memory device 220-1) or second multimedia card MMC2 (second memory device 220-2) occurs as described above with reference to FIG. 5 which is different from the general MMC or SD card specifications. In order to perform the open-ended write operation illustrated in FIG. 6, host 210 first uses both the first selection command CMD7#1 and the second command CMD25 associated with the first multimedia card MMC1 (first memory device 220-1) and the second multimedia card MMC2 (second memory device 220-2). After transmitting the second data D1 through D4, host 210 alternately uses the first selection command CMD7#1 and second selection command CMD7#2 to transmit data blocks B5 through B12 or D5 through D12 to the first or second memory device 220-1 or 220-2. Host 210 transmits a stop command CMD12 to system bus 30 after transmitting the last of the data blocks B9 through B12 or D9 through D12 from the transmitted 12 data blocks B1 through B12 or D1 through D12.

Figure 7:
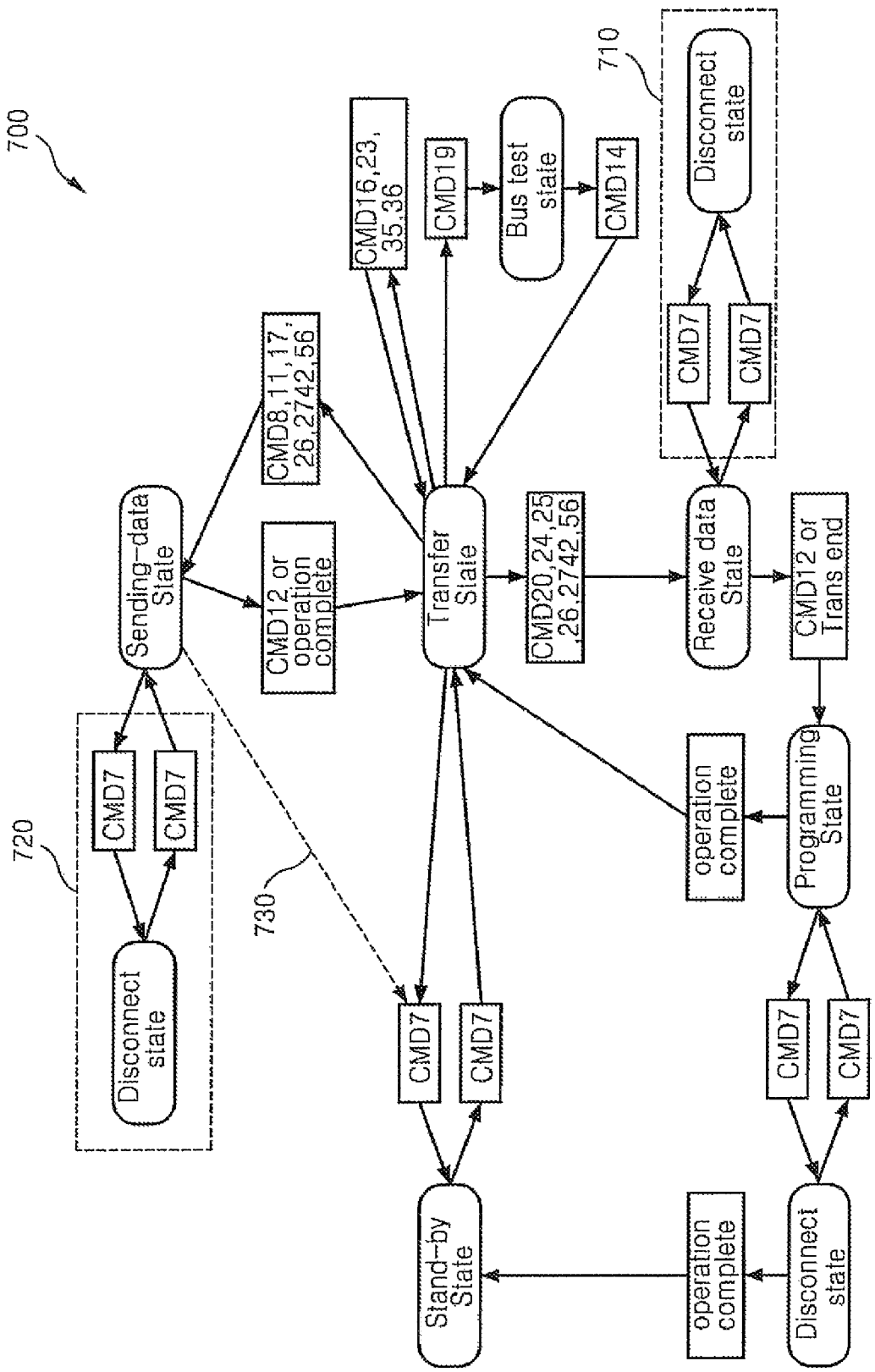
FIG. 7 is a state diagram of memory devices that use the MMC or SD protocol according to the timing diagrams illustrated in FIGS. 5 and 6 according to an embodiment of the present invention.

FIG. 7 is a state diagram 700 of memory devices that use the MMC or SD protocol according to the timing diagrams illustrated in FIGS. 5 and 6 where command CMD7 may be the first or second selection command CMD7#1 or CMD7#2. First and second blocks 710 and 720 indicated by a dotted line are added to and a dotted arrow 730 is canceled from the state diagram of memory devices using an MMC or SD protocol according to the general MMC or SD card specifications. That is, first and second multimedia cards MMC1 or MMC2 are either in the "receiving data" state or the disconnected state until the total number of data blocks (e.g., a total of 12data blocks) associated with the write operation illustrated in FIGS. 5 and 6 are received from host 210. Host 210 may perform a read operation by alternately selecting the first and second multimedia cards MMC1 and MMC2 to read the sequence of data blocks transmitted for the write operation illustrated in FIG. 5 or 6. Unlike the general MMC or SD card specifications, the first or second multimedia cards MMC1 or MMC2 are not switched from the sending data state to the stand-by state in response to selection command CMD7 (CMD7#1 or CMD7#2). Reference arrow 730 of FIG. 7 is canceled from the state diagram of memory devices using the MMC or SD protocol according to the general MMC or SD card specifications. In addition, unlike the general MMC or SD card specifications, first multimedia card MMC1 is in the "sending data" state and second multimedia card MMC2 is in the disconnected state in response to selection command CMD7 (CMD7#1 or CMD7#2).

Figure 8:
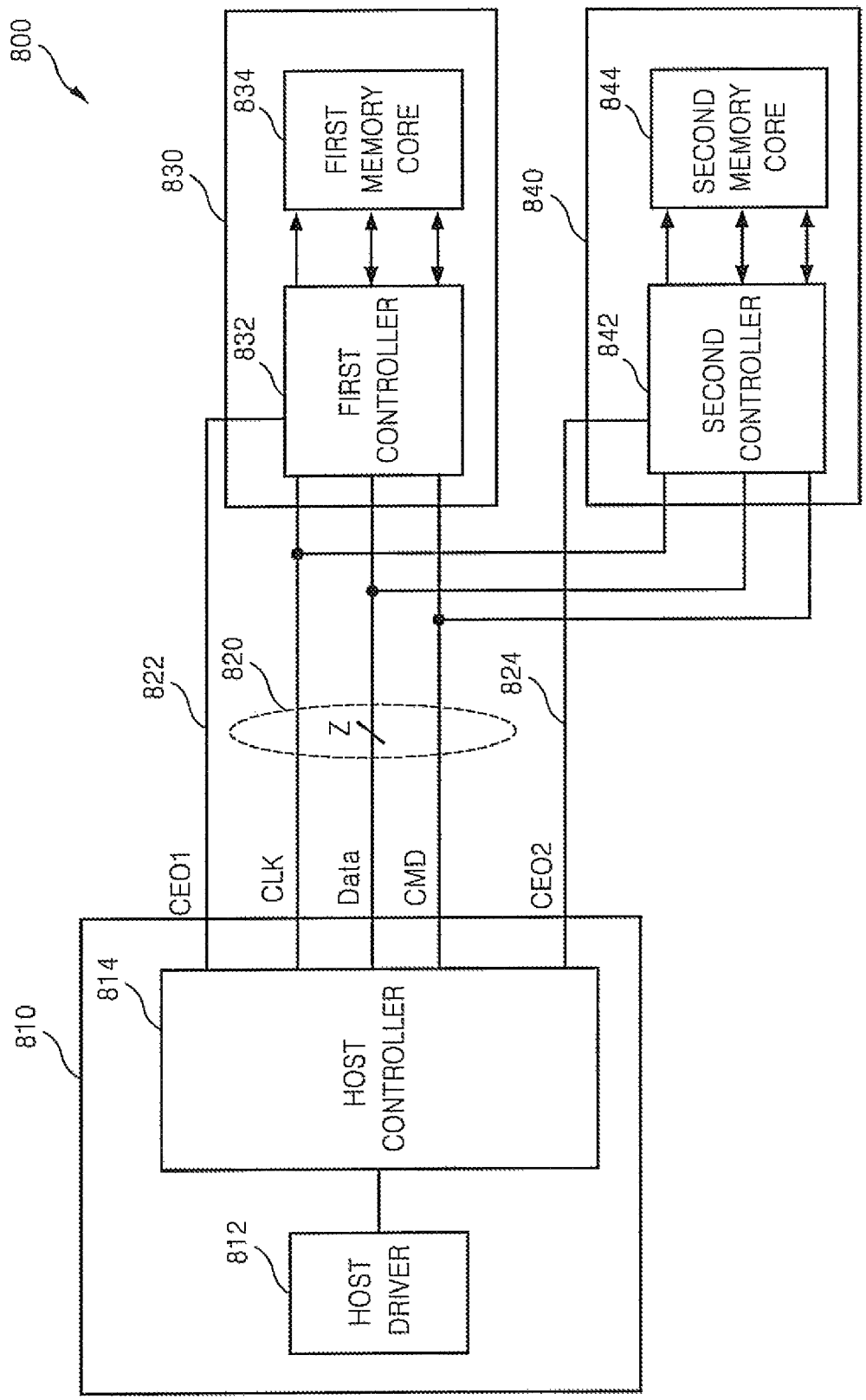
FIG. 8 is a block diagram of an interface system between a host and a plurality of memory devices that use MMC or SD protocol according to another embodiment of the present invention.

FIG. 8 is a block diagram of an interface system 800 disposed between host 810 and a plurality of memory devices utilizing the MMC or SD protocol. For convenience of explanation, FIG. 8 illustrates only two memory devices 830 and 840 among the plurality of the memory devices and utilizes the MMC or SD protocol. System 800 includes host 810, system bus 820, first transmission line 822, second transmission line 824, first memory device 830, and second memory device 840. Host 810 includes host driver 812 and host controller 814. Host driver 812 and host controller 814 operate similarly to host driver 214 and host controller 216 shown in FIG. 2. System buses 820 include clock bus CLK, data bus DATA, and command bus CMD. First memory device 830 includes first controller 832 and first memory core 834. Second memory device 840 includes second controller 842 and second memory core 844. First and second memory devices 830 and 840 are connected to host 810 via system bus 820 and receives clock signal CLK, data Data, and command signal CMD from host 810 via system bus 820. First controller 832 enables or disables in response to first enable signal CEO1 received from host 810 via first transmission line 822. First controller 832 provides first memory core 834 with clock signal CLK, data Data, and command signal CMD received from host 810 in response to first enable signal CEO1. The second controller 842 may operate the same as first controller 832.

First controller 832 includes a first input/output (I/O) control logic circuit (not shown) that controls clock signal CLK, data Data, and command signal CMD for transmission to first memory core 834 in response to first enable signal CEO1. First I/O control logic circuit may be separate from first memory device 830. Similarly, second controller 842 may include a second I/O control logic circuit having the same operation of the first I/O control logic circuit and may be separate from second memory device 840.

Figure 9:
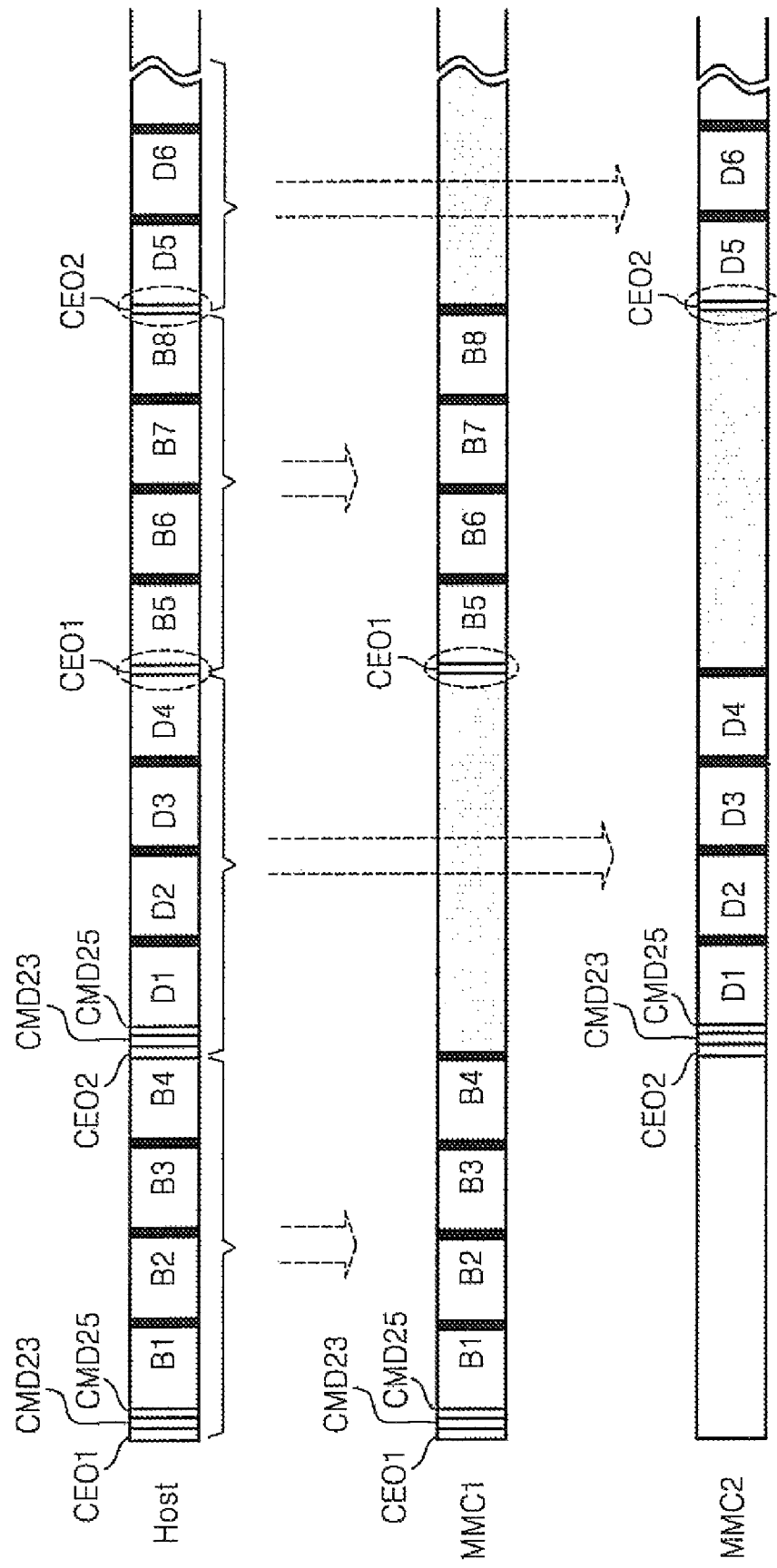
FIG. 9 is a fifth timing diagram of a predefined write operation of the interface system illustrated in FIG. 8 according to an embodiment of the present invention.

FIG. 9 is another timing diagram of a predefined write operation of the interface system 800 illustrated in FIG. 8. Host 810 transmits a first sequence of commands (not shown) to system bus 820 in order to switch both the first memory device 830 and the second memory device 840 from the stand-by state to the transfer state. For example, the first sequence of the commands may include a first enable signal CEO1 and the first selection command CMD7#1 at a first level (high), and a second enable signal CEO2 and the second selection command CMD7#2 also at the first level. Alternatively, first enable signal CEO1 may be at a high level and second enable signal CEO2 may be at a low level.

In order to perform the predefined write operation, both the first and second memory devices 830 and 840 are in the transfer state. The second sequence of commands and data may include first enable command CEO1, first command CMD23, second command CMD25, and first data (data blocks B1 through B4). First enable command CEO1 is transmitted to first memory device 830 via first transmission line 822 to only enable first memory device 830. First command CMD23 may be a command for determining the size of the data to be transmitted when the write operation is performed and second command CMD25 may initiate the write operation to be performed. The third sequence of commands and data may be a second enable command CEO2, first command CMD23, second command CMD25, and second data (data blocks D1 through D4). The system 800 illustrated in FIG. 8 uses the first enable signal CEO1 or second enable signal CEO2 instead of the first selection command CMD7#1 or second selection command CMD7#2 illustrated in FIG. 5.

After transmitting the second data blocks D1 through D4, host 810 transmits the other data blocks B5 through B12 or D5 through D12 to first memory device 830 or the second memory device 840 by alternately using the first enable signal CEO1 and the second enable signal CEO2. Accordingly, the number of times that command CMD7 is utilized to perform the write operation is reduced and all the memory devices of system 800 are in the transfer state. Thus, there is no need to determine whether a command error occurs.

Figure 10:
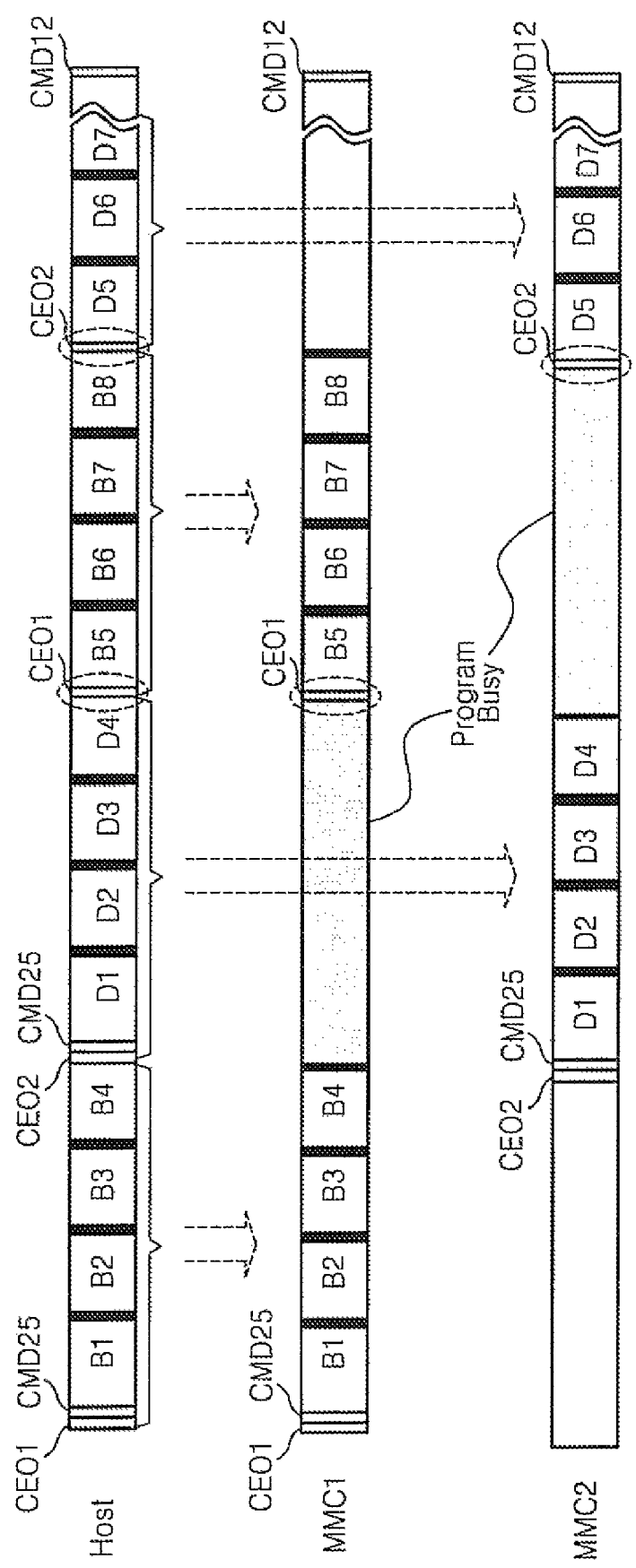
FIG. 10 is a sixth timing diagram of an open-ended write operation of the interface system illustrated in FIG. 8 according to an embodiment of the present invention.

FIG. 10 is another timing diagram of an open-ended write operation of system 800 illustrated in FIG. 8. A first enable signal CEO1 or second enable signal CEO2 is used in place of first selection command CMD7#1 or second selection command CMD7#2. As in FIG. 9, it is assumed that both the first memory device 830 and second memory device 840 are in the transfer state to perform the open-ended write operation illustrated in FIG. 10. The second sequence of commands and data may include the first enable command CEO1, first data (data blocks B1 through B4), and first command CMD25 that instructs the open-ended write operation to be performed. The third sequence of commands and data may include second enable command CEO2, second data (data blocks D1 through D4), and first command CMD25 that instructs the write operation to be performed. Host 810 transmits data blocks B5 through B12 or D5 through D12 to first memory device 830 or second memory device 840 by alternately using the first enable signal CEO1 and the second enable signal CEO2.

In an erase operation, the interface between a host and a plurality of memory devices is established by using the interleaving scheme as described above with reference to FIGS. 3 and 4. For example, during a busy time in which first memory device 220-1 among the memory devices 220-1 through 220-*n* is performing the erasing operation, host 210 transmits to the system bus 30 a sequence of predetermined commands necessary for the second memory device 220-2 to perform the erasing operation. The sequence of the predetermined commands, such as commands CMD7, CMD35, CMD36 and CMD38 are defined in the MMC or SD card specifications.

As described above, in a method and system for establishing an interface between a host and a plurality of semiconductor devices that use an MMC or SD protocol according to the present invention, the interface may be rapidly performed using the interleaving scheme. In addition, a reduced number of commands are necessary to perform the write operation.

Although the present invention has been described in connection with the embodiment of the present invention illustrated in the accompanying drawings, it is not limited thereto. It will be apparent to those skilled in the art that various substitutions, modifications and changes may be made thereto without departing from the scope and spirit of the invention. For example, the present invention may be embodied as computer readable code in a computer readable medium where the computer readable medium may be any recording medium capable of storing data and read by a computer system.

What is claimed is:

1. A method of establishing an interface between a host and a plurality of memory devices connected to a system bus that utilizes an MMC (multimedia card) or SD (secure digital) protocol, the method comprising:

transmitting a first sequence including a first selection command to select only a first of the memory devices, a first command for determining a total number of first data blocks to be transmitted, a second command to perform a write operation, and a plurality of first data blocks; and transmitting a second sequence including a second selection command to select only a second of the memory devices, the first command for determining a total number of second data blocks to be transmitted, the second command, and plurality of second data blocks, after said transmitting the first sequence during a program busy time of the first memory device, wherein the first and second memory devices are in states in order of a disconnected state, a stand-by state, a transfer state, and a data receiving state before the plurality of second data blocks are received, respectively, and the first and second memory devices are in either the data receiving state or the disconnected state until the total number of the first data blocks and the total number of the second data blocks are received from the host after receiving the plurality of second data blocks in response to the first selection command or the second selection command, respectively.

2. The method of claim 1, wherein the total number of the first data blocks is determined based on a capacity of a buffer included in the first memory device, and the total number of the second data blocks is determined based on a capacity of a buffer included in the second memory device.

3. The method of claim 1, wherein each of a plurality of sequences after said transmitting the second sequence are a combination of the first selection command and the plurality of the first data blocks, or a combination of the second selection command and the plurality of the second data blocks.

4. The method of claim 1, wherein the first selection command instructs the first memory device to switch from the stand-by state to the transfer state, and the second selection command instructs the first memory device to switch to the disconnected state and the second memory device to switch from the stand-by state to the transfer state.

5. A method of establishing an interface between a host and a plurality of memory devices connected to a system bus that utilizes an MMC (multimedia card) or SD (secure digital) protocol, the method comprising:

transmitting a first sequence including a first selection command to select only a first of the memory devices, a first command to perform a write operation, and a plurality of first data blocks; and transmitting a second sequence including a second selection command to select only a second of the memory devices, the first command, and a plurality of second data blocks after transmitting the first sequence, during a program busy time of the first memory device, wherein the first and second memory devices are in states in order of a disconnected state, a stand-by state, a transfer state, and a data receiving state before the plurality of second data blocks are received, respectively, and the first and second memory devices are in either the data receiving state or the disconnected state until a total number of the first data blocks and a total number of the second data blocks are received from the host after receiving the plurality of second data blocks in response to the first selection command or the second selection command, respectively.

6. The method of claim 5, wherein the total number of the first data blocks is determined based on a capacity of a buffer included in the first memory device, and the total number of the second data blocks is determined based on a capacity of a buffer included in the second memory device.

7. The method of claim 5, wherein each of a plurality of sequences after said transmitting the second sequence are a combination of the first selection command and the plurality of the first data blocks, or a combination of the second selection command and the plurality of the second data blocks.

8. The method of claim 7, wherein the host transmits stop commands to the system bus after transmitting a last of the first data blocks and transmitting a last of the second data blocks.

9. The method of claim 5, wherein the first selection command instructs the first memory device to switch from the stand-by state to the transfer state, and the second selection command instructs the first memory device to switch to the disconnected state and the second memory device to switch from the stand-by state to the transfer state.

10. A data system using an MMC (multimedia card) or SD (secure digital) protocol, the data system comprising:
   a system bus;
   a plurality of transmission lines;
   a plurality of memory devices utilizing the MMC or SD protocol, each of the memory devices being connected to the system bus and one of the transmission lines; and
   a host using the MMC or SD protocol, the host being connected to the memory devices via the system bus and the respective transmission lines,
   wherein the host transmits a first sequence including a first selection command to select only a first of the memory devices, a first command for determining a total number of first data blocks to be transmitted, a second command to perform a write operation, and a plurality of first data blocks, and a second sequence including a second selection command to select only a second of the memory devices, the first command for determining a total number of second data blocks to be transmitted, the second command, and a plurality of second data blocks after transmitting the first sequence during a program busy time of the first memory device, and
   wherein the first and second memory devices are in states in order of a disconnected state, a stand-by state, a transfer state, and a data receiving state before the plurality of second data blocks are received, respectively, and the first and second memory devices are in either the data receiving state or the disconnected state until the total number of the first data blocks and the total number of the second data blocks are received from the host after receiving the plurality of second data blocks in response to the first selection command or the second selection command, respectively.

11. The data system of claim 10, wherein the total number of the first data blocks is determined based on a capacity of a buffer included in the first memory device, and the total number of the second data blocks is determined based on a capacity of a buffer included in the second memory device.

12. The data system of claim 10, wherein each of a plurality of sequences after transmitting the second sequence are a combination of the first selection command and the plurality of the first data blocks, or a combination of the second selection command and the plurality of the second data blocks.

13. The data system of claim 10, wherein the first selection command instructs the first memory device to switch from the stand-by state to the transfer state, and the second selection command instructs the first memory device to switch to the disconnected state and the second memory device to switch from the stand-by state to the transfer state.

14. A data system using an MMC (multimedia card) or SD (secure digital) protocol, the data system comprising:
   a system bus;
   a plurality of transmission lines;
   a plurality of memory devices utilizing the MMC or SD protocol, each of the memory devices being connected to the system bus and one of the transmission lines; and
   a host using the MMC or SD protocol, the host being connected to the memory devices via the system bus and the respective transmission lines,
   wherein the host transmits a first sequence including a first selection command to select only a first of the memory devices, a first command to perform a write operation, and a plurality of first data blocks, and a second sequence including a second selection command to select only a second of the memory devices, the first command, and a plurality of second data blocks after transmitting the first sequence, during a program busy time of the first memory device, and
   wherein the first and second memory devices are in states in order of a disconnected state, a stand-by state, a transfer state, and a data receiving state before the plurality of second data blocks are received, respectively, and the first and second memory devices are in either the data receiving state or the disconnected state until a total number of the first data blocks and a total number of the second data blocks are received from the host after receiving the plurality of second data blocks in response to the first selection command or the second selection command, respectively.

15. The data system of claim 14, where the total number of the first data blocks is determined based on a capacity of a buffer included in the first memory device, and the total number of the second data blocks is determined on a capacity of a buffer included in the second memory device.

16. The data system of claim 14, wherein each of a plurality of sequences after transmitting the second sequence are a combination of the first selection command and the plurality of the first data blocks, or a combination of the second selection command and the plurality of the second data blocks.

17. The data system of claim 14, wherein the first selection command instructs the first memory device to switch from the stand-by state to the transfer state, and the second selection command instructs the first memory device to switch to the disconnected state and the second memory device to switch from the stand-by state to the transfer state.

18. The data system of claim 14, wherein the host transmits stop commands to the system bus after transmitting a last of the first data blocks and transmitting a last of the second data blocks.

* * * * *